UNITED STATES PATENT OFFICE.

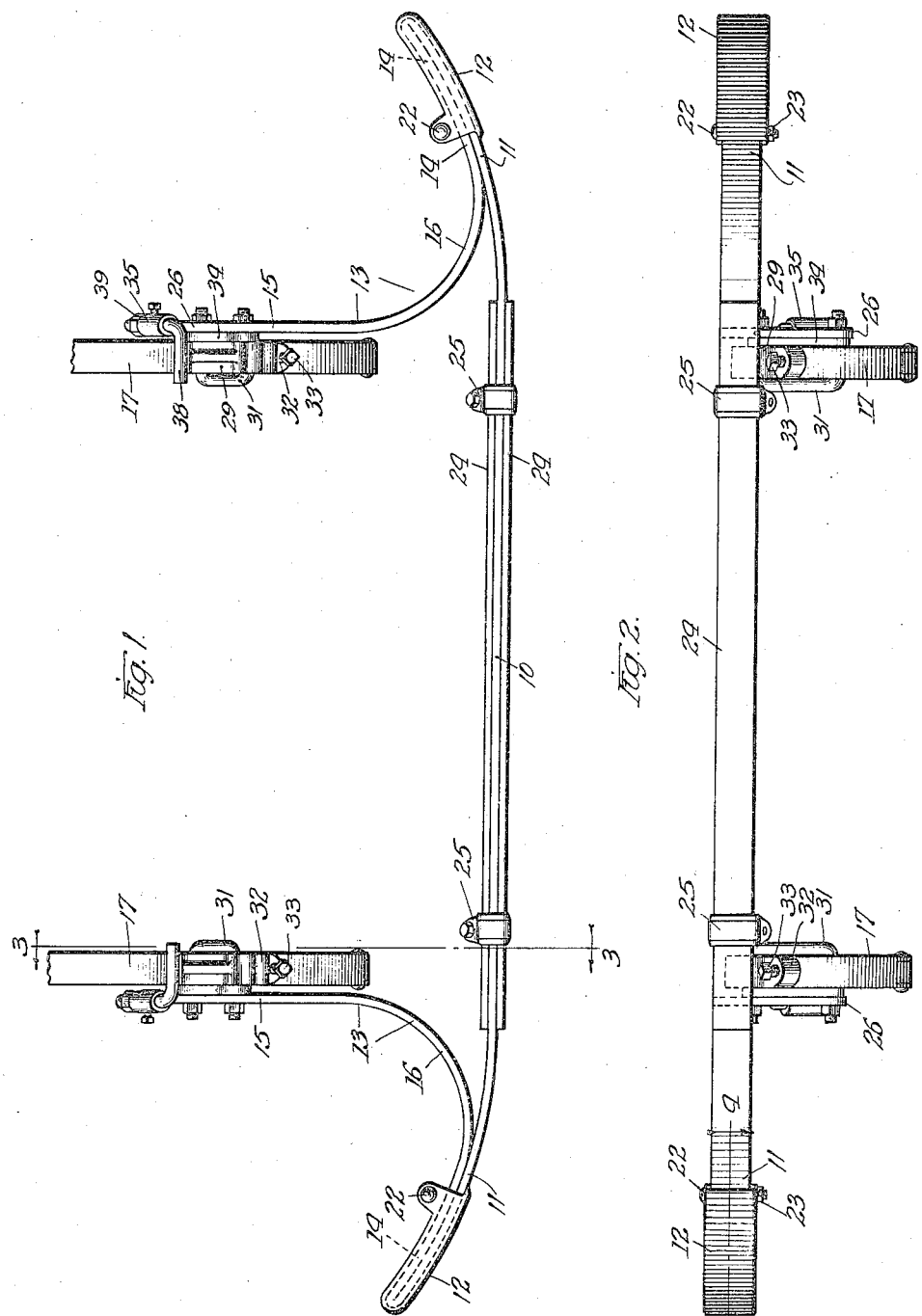

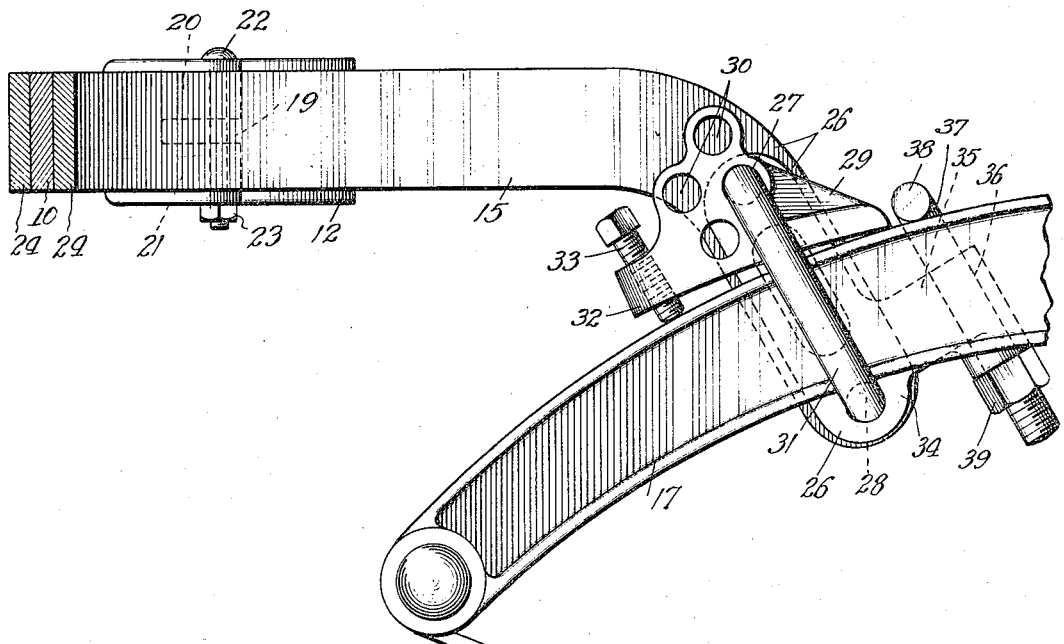
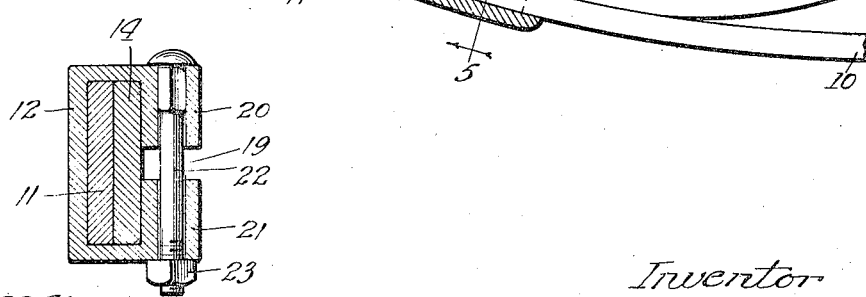

ALLAN L. McGREGOR, OF CHICAGO, ILLINOIS.

AUTOMOBILE-BUMPER.

1,300,433.

Specification of Letters Patent. Patented Apr. 15, 1919.

Application filed January 19, 1917. Serial No. 143,229.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

My invention relates to automobile bumpers, particularly to bumpers adapted to be secured to the front ends of the vehicle chassis side beams.

The object of my invention is to produce a strong and efficient bumper structure of simple and inexpensive construction and one that can be more readily adjusted laterally to fit chassis frames of different widths.

On the accompanying drawings the various features of my invention are clearly shown. In the drawings—

Figure 1 is a plan view of a bumper structure applied to the front ends of chassis side beams, Fig. 2 is a front view, Fig. 3 is an enlarged side elevational view on plane 3—3, Fig. 1, Fig. 4 is an enlarged sectional view on plane 4—4, Fig. 2, and Fig. 5 is a sectional view on plane 5—5, Fig. 4.

The bumper structure shown comprises a front bumper bar 10 which extends across the front of the chassis frame, the greater part thereof being straight but its ends 11 being gradually cured rearwardly to be in front of the vehicle steering wheels. The front bumper bar is supported at its ends in sleeve or cap fittings 12 which are carried at the outer ends of the supporting bow structures 13. Each of these structures has the outer end 14 substantially parallel with the curved end of the bumper bar, the rearwardly extending end 15 and the gradually curved spring elbow 16, the ends 15 of the curved spring elbow 16, the ends 15 of the bow structures being secured to the front ends 17 of the chassis side beams. The fittings 12 are of rectangular cross-section to receive the overlapping ends 11 and 14 of the bumper bar and bow structures, the outer ends of the fittings being preferably closed by walls 18. The inner wall of each fitting has the longitudinal slot 19 extending outwardly from the inner end of the fitting and at such outer end the wall has upper and lower lugs 20 and 21 for receiving a clamping bolt 22, screwing up of the nut 23 causing the fitting sections above and below the slot 19 to be drawn together to securely clamp the ends 11 and 14 and movably fix them in the fitting. When the nut is loosened the fitting and the ends 11 and 14 will be relatively movable for adjustment purposes. This arrangement enables ready adjustment to be made for the distance between the inner ends 15 of the supporting bow structures so that the bumper structure can be readily fitted to vehicle chassis frames of different width. These cap or sleeve fittings serve also to strengthen and protect the ends 11 and 14 of the bumper bar and bow structures respectively without detracting from the resiliency and elasticity of the structure as a whole. The fittings may also be shifted laterally to increase or decrease the width of the bumper structure. If desired, the bumper bar 10 may be strengthened by one or more reinforcing bars 24 which can readily be held to the bumper bar by clamps 25 of suitable construction.

Any suitable means may be provided for securing the bow structures 13 to the chassis side beams. As best shown in Figs. 1 and 3, the innermost ends 26 of the sections 15 of the structures are deflected diagonally downwardly, each end being provided with upper and lower holes 27 and 28. A fitting 29 in the form of a casting is provided for engaging with the top of the chassis side beam and has transverse holes 30 therethrough for selectively registering with the upper hole 27 in the end 26. A strap or U-bolt 31 receives the chassis end with its lower limb extending through the hole 28 of the end 26 and its upper limb extending through the hole 27 and through one of the holes 30 of the fitting 29. At its front end the fitting has the lug 32 through which extends a jack screw 33 for abutting against the chassis end to elevate the upper end of the fitting thereon to clamp it securely to the chassis side. To further strengthen the connection a plate 34 is interposed between the end 26 and the chassis side beam and has holes for registering with the holes 27 and 28 of the end 26. A lug 35 extending rearwardly from the plate 34 has the hole 36 for receiving the hook bolt 37 whose end 38 engages with the top of the chassis side beam and whose lower end is threaded to receive a nut 39. By means of the U-bolts 31, the jack screws 33 and the hook bolts 37 the ends 15 of the bumper structure can be fitted into the desired position on the chassis ends 17 and rigidly secured thereto.

The bumper structure disclosed is of simple and strong construction and possesses the necessary resiliency to effectively absorb a considerable portion of bumping blows, this resiliency being both longitudinal and transverse. The fittings 12 connecting the outer ends of the bumper bar and supporting bow structures strengthen and protect such ends and permit ready adjustment of the structure for different widths of vehicle frames.

I do not, of course, desire to be limited to the exact construction and arrangement shown as changes and modifications can no doubt be made which would still come within the scope of the invention. I claim as follows:

1. In a bumper structure, the combination of an integral front bumper bar, supporting bow L-shape structures for said bar having their outer ends alongside of and parallel for a distance with the outer ends of said bar and having their inner ends extending rearwardly from and at right angles with said bumper bar, fittings at the inner ends of said bow structures for securing such ends to a vehicle frame, sleeve fittings receiving the parallel outer ends of the bumper bar and bow structures, and clamping means on said fittings for securing the received ends rigidly together.

2. In a bumper structure, the combination of a bumper bar, supporting bow structures having their inner ends extending rearwardly and adapted to be secured to a vehicle frame, the front ends of said bow structures extending laterally outwardly into parallelism with and alongside of the ends of the bumper bar, caps receiving the respective ends of the bumper bar and bow structures, said ends being relatively shiftable and movable in said caps whereby the distance between the inner ends of said bow structures may be readily adjusted, and means on said caps for securing them and the received ends rigidly together.

3. In a bumper structure, the combination of an integral bumper bar of a width to extend laterally beyond the side frames of a vehicle and in front of the wheels thereof, L-shaped supporting bow structures, means for securing the rearwardly extending ends of said bow structures to the side frames of a vehicle, the laterally outwardly extending ends of the bow structures being alongside of and in contact with the ends of the bumper bar, sleeve members receiving the engaging ends for protecting such ends, said ends being shiftable in said sleeve members to permit adjustment of the bow structures in accordance with the varying distances between side frames of different vehicles, and means for clamping said sleeve members to said ends after adjustment.

In witness whereof I hereunto subscribe my name this 17th day of January, A. D. 1917.

ALLAN L. McGREGOR.